United States Patent
Xie et al.

(10) Patent No.: US 9,438,913 B2
(45) Date of Patent: Sep. 6, 2016

(54) METHOD, APPARATUS AND SYSTEM FOR EVALUATING QUALITY OF VIDEO STREAMS

(71) Applicant: SNAPTRACK, INC., San Diego, CA (US)

(72) Inventors: Qingpeng Xie, Shenzhen (CN); Fuzheng Yang, Shenzhen (CN); Shuai Wan, Shenzhen (CN)

(73) Assignee: SNAPTRACK, INC., San Diego, CA (US)

( * ) Notice: Subject to any disclaimer, the term of this patent is extended or adjusted under 35 U.S.C. 154(b) by 134 days.

(21) Appl. No.: 14/050,740

(22) Filed: Oct. 10, 2013

(65) Prior Publication Data

US 2014/0037016 A1    Feb. 6, 2014

Related U.S. Application Data

(63) Continuation of application No. 12/855,110, filed on Aug. 12, 2010, now Pat. No. 8,576,921, which is a continuation of application No. PCT/CN2009/072127, filed on Jun. 4, 2009.

(30) Foreign Application Priority Data

Jul. 10, 2008    (CN) .......................... 2008 1 0068503

(51) Int. Cl.
*H04N 7/12*    (2006.01)
*H04N 19/89*    (2014.01)
(Continued)

(52) U.S. Cl.
CPC ........ *H04N 19/00933* (2013.01); *H04L 65/80* (2013.01); *H04N 17/004* (2013.01);
(Continued)

(58) Field of Classification Search
CPC ................................................ H94N 19/00933
USPC ..................................................... 375/240.26
See application file for complete search history.

(56) References Cited

U.S. PATENT DOCUMENTS 8,130,274 B2    3/2012    Okamoto et al.
8,576,921 B2    11/2013   Xie et al.
(Continued)

FOREIGN PATENT DOCUMENTS

CN    1809175 A    7/2006
CN    1859584 A    11/2006
(Continued)

OTHER PUBLICATIONS

Yang, F., et al., "A Novel Objective no-Reference Metric for Digital Video Quality Assessment," IEEE Signal Processing Letters, vol. 12, No. 10, Oct. 2005.
(Continued)

*Primary Examiner* — Richard Torrente
(74) *Attorney, Agent, or Firm* — Seyfarth Shaw LLP

(57) ABSTRACT

A method for evaluating quality of video streams includes: obtaining video streams; obtain coding information of video frames in the video stream; evaluating the single frame quality according to the coding information of the video frames; and evaluating the sequence quality according to the single frame quality evaluation result. An apparatus and a system for evaluating quality are also provided. Thus, the quality of video data packets transmitted in a channel can be predicted accurately, and the single frame quality evaluation result of the video frames can be obtained immediately.

15 Claims, 4 Drawing Sheets

(51) Int. Cl.
*H04N 17/00* (2006.01)
*H04N 21/4385* (2011.01)
*H04N 21/44* (2011.01)
*H04N 21/442* (2011.01)
*H04L 29/06* (2006.01)
*H04N 19/159* (2014.01)
*H04N 19/61* (2014.01)

(52) U.S. Cl.
CPC ............ *H04N19/159* (2014.11); *H04N 19/61* (2014.11); *H04N 19/89* (2014.11); *H04N 21/4385* (2013.01); *H04N 21/442* (2013.01); *H04N 21/44008* (2013.01)

(56) References Cited

U.S. PATENT DOCUMENTS

| | | | |
|---|---|---|---|
| 2002/0061184 A1* | 5/2002 | Miyamoto | H04N 5/783 386/232 |
| 2007/0081596 A1 | 4/2007 | Lin et al. | |
| 2007/0133608 A1 | 6/2007 | Isambart et al. | |
| 2007/0263897 A1 | 11/2007 | Ong et al. | |
| 2008/0143837 A1 | 6/2008 | Okamoto et al. | |
| 2008/0159410 A1* | 7/2008 | Perinkulam et al. | 375/240.27 |
| 2008/0181311 A1* | 7/2008 | Zhang | H04N 19/176 375/240.24 |
| 2008/0198922 A1 | 8/2008 | Rhie et al. | |
| 2010/0053300 A1* | 3/2010 | Einarsson | H04L 65/80 348/14.01 |

FOREIGN PATENT DOCUMENTS

| | | |
|---|---|---|
| CN | 101036399 A | 9/2007 |
| CN | 101087438 A | 12/2007 |
| CN | 101213846 A | 7/2008 |
| CN | 101626506 B | 6/2011 |
| JP | 2006033722 A | 2/2006 |
| JP | 2007019802 A | 1/2007 |
| JP | 2007043642 A | 2/2007 |
| JP | 2007067626 A | 3/2007 |
| JP | 2007258919 A | 10/2007 |
| JP | 2007329778 A | 12/2007 |
| JP | 2008/005108 A | 1/2008 |
| JP | 2008005108 A | 1/2008 |
| JP | 2008187501 A | 8/2008 |
| WO | 2005074175 A1 | 8/2005 |
| WO | 2007129423 A1 | 11/2007 |

OTHER PUBLICATIONS

Mohamed, S. et a., "A Study of Real-Time Packet Video Quality Using Random Neural Networks," IEEE Transactions on Circuits and Systems for Video Technology, vol. 12, No. 12, Dec. 2002.

Extended European Search Reprot dated (mailed) Jan. 12, 2011, issued in related Applicatoin No. 09793813.8-1241, PCT/CN2009072127, Huawei Technologies Co., Ltd.

Verscheure, O. et al., "User-Oriented QoS Analysis in MPEG-2 Video Deliver," Real-Time Imaging 5, 305-314 1999.

Qing, C., et al., "Video Quality Assessing Model Based on Single Image Quality with Different Weights," Journal of Beijing University of Aeronautics and Astronautics, vol. 22 No. 3, Mar. 2007.

Written Opinion of the ISR (translation) dated (mailed) Sep. 17, 2009, issued in related Application No. PCT/CN2009/072127, filed Jun. 4, 2009, Huawei Technologies. Co.

Rejection decision issued in corresponding Japanese patent application No. 2010-547940, dated Aug. 14, 2012, and English translation thereof, total 8 pages.

International Search Report and Written Opinion received in International Application No. PCT/CN2009/072127 dated Sep. 17, 2009, 10 pages.

Notice of Reasons for Rejection received in Japanese Application No. 2010-547940 with English translation mailed Aug. 14, 2012, 8 pages.

Knee, Mike, "A Single-Ended Picture Quality Measure for MPEG-2," Snell and Wilcox, UK, 1999, 6 pages.

Mohamed, S., et al., "A Study of Real-Time Packet Video Quality Using Random Neural Networks," IEEE Transactions on Circuits and Systems for Video Technology, vol. 12, No. 12, Dec. 2002, pp. 1071-1083.

Verscheure, O., et al. "User-Oriented QoS Analysis in MPEG-2 Video Delivery", J. Real-Time Imag., vol. 5, 1999, pp. 305-314.

* cited by examiner

METHOD, APPARATUS AND SYSTEM FOR EVALUATING QUALITY OF VIDEO STREAMS

This application is a continuation of U.S. patent application Ser. No. 12/855,110, filed Aug. 12, 2010, which is a continuation of International Application No. PCT/CN2009/072127, filed on Jun. 4, 2009 claiming priority to Chinese Patent Application No. 200810068503.7, filed on Jul. 10, 2008, all of which are hereby incorporated by reference in their entireties.

TECHNICAL FIELD

The present invention relates to a mobile communications technology, and in particular, to a method, an apparatus and a system for evaluating the quality of video streams.

BACKGROUND

With the constant development of network technologies, video on demand (VOD), IPTV and videophone services that are developed on the basis of network videos have become the main services on broadband networks. Thus, the quality of service (QoS) of the network videos may affect the development of such services directly.

To guarantee the QoS of network videos, it is necessary to perform quality evaluation and monitoring on the network videos, so that related adjustment and maintenance measures can be taken immediately to guarantee the normal operations of the preceding services.

In the prior art, a neural network is used to evaluate the quality of network videos according to parameters such as video rate, video frame rate, packet loss ratio, and number of intra-frame coded macro blocks.

In the prior art, the impacts of the video rate and packet loss ratio on the video quality are analyzed from the perspective of statistics. Nevertheless, a statistics method may obtain an inaccurate video rate and packet loss ratio, and thus the video quality cannot be evaluated accurately. Therefore, only overall sequence rating can be given, and no immediate quality of video frames is provided.

SUMMARY OF THE INVENTION

Embodiments of the present invention provide a method, an apparatus and a system to evaluate the quality of network videos accurately and obtain video quality immediately.

A method for evaluating quality of video streams provided in an embodiment of the present invention includes:
obtaining video streams;
obtaining coding information of video frames in the video streams;
evaluating single frame quality according to the coding information of the video frames; and
evaluating sequence quality according to the single frame quality evaluation result.

An apparatus for evaluating quality of video streams provided in an embodiment of the present invention includes:
a stream analyzing module, configured to obtain video streams from video data packets and obtain coding information of video frames in the video streams;
a single frame quality evaluating module, configured to evaluate single frame quality according to the coding information of the video frames; and a sequence quality evaluating module, configured to evaluate sequence quality according to the single frame quality evaluation result.

A system for evaluating quality of video streams provided in an embodiment of the present invention includes:
an apparatus for evaluating quality, configured to obtain video streams from video data packets to obtain the coding information of the video frames in the video streams, evaluate single frame quality according to the coding information of the video frames, and evaluate sequence quality according to the single frame quality evaluation result; and
a sending apparatus, configured to send the single frame quality evaluation result or sequence evaluation result of the apparatus for evaluating quality.

With the preceding method, apparatus and system for quality evaluation, the coding information of the video frames is obtained; the single frame and sequence quality is evaluated and output according to the coding information of the video frames; the sequence quality of frames within a time segment is evaluated and output. Thus, the quality of video data packets transmitted in a channel may be predicted accurately, and the single frame quality evaluation result of the video frames may be obtained immediately.

BRIEF DESCRIPTION OF THE DRAWINGS

To make the technical solution under the present invention or in the prior art clearer, the accompanying drawings for illustrating the embodiments of the present invention or illustrating the prior art are outlined below. Evidently, the accompanying drawings are exemplary only, and those skilled in the art can derive other drawings from such accompanying drawings without creative work.

DETAILED DESCRIPTION OF ILLUSTRATIVE EMBODIMENTS

The technical solution of the present invention is hereinafter described in detail with reference to the accompanying drawings. It is evident that the embodiments are exemplary and the present invention is not limited to such embodiments. Other embodiments that those skilled in the art derive from the embodiments of the present invention also fall in the scope of protection of the present invention.

Figure 1:
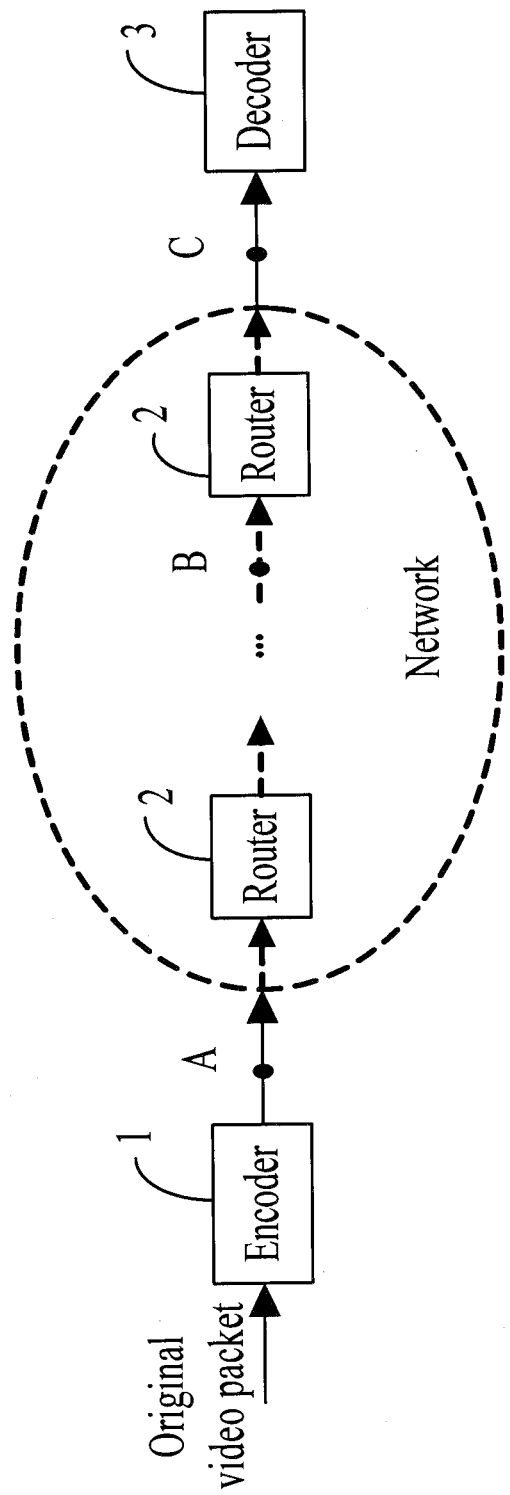
FIG. 1 is a schematic diagram illustrating an application environment of a system for evaluating quality of video streams in an embodiment of the present invention.

FIG. 1 is a schematic diagram illustrating an application environment of a system for evaluating quality of video streams in an embodiment of the present invention. In this embodiment, after an original video packet is encoded by an encoder 1, the encoded video packet is transmitted a decoder 3 through a router 2 and is then played after being decoded. Points A, B and C shown in FIG. 1 are three different branch points in the transmission path. The system may be used in any one of those three points to obtain encoded video streams and evaluate the video quality of the obtained video streams.

Figure 2:
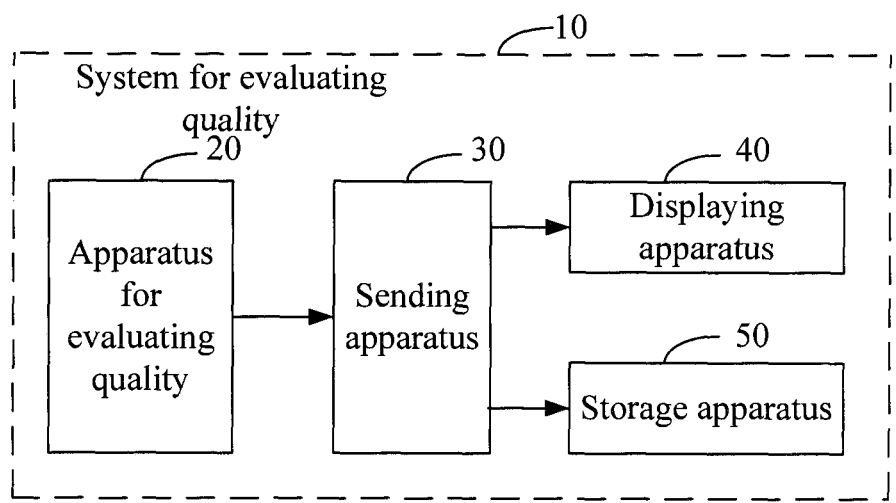
FIG. 2 shows a structure of a system for evaluating quality of video streams in an embodiment of the present invention.

FIG. 2 shows a structure of a system 10 for evaluating quality of video streams in an embodiment of the present invention. In this embodiment, the system 10 for evaluating quality includes an apparatus 20 for evaluating quality, a sending apparatus 30, a displaying apparatus 40, and a storage apparatus 50. The apparatus 20 for evaluating quality is configured to evaluate the single frame quality and sequence quality of the obtained video data packets. The sending apparatus 30 is configured to send the single frame quality evaluation result or sequence quality evaluation result of the apparatus 20 for evaluating quality to the displaying apparatus 40 or storage apparatus 50. The displaying apparatus 40 is configured to display the single frame quality evaluation result or sequence quality evaluation result sent by the sending apparatus 30 when the evaluated video quality needs to be displayed. The storage apparatus 50 is configured to store the single frame quality evaluation result or sequence quality evaluation result sent by the sending apparatus 30 when the evaluated video quality does not need to be displayed.

Figure 3:
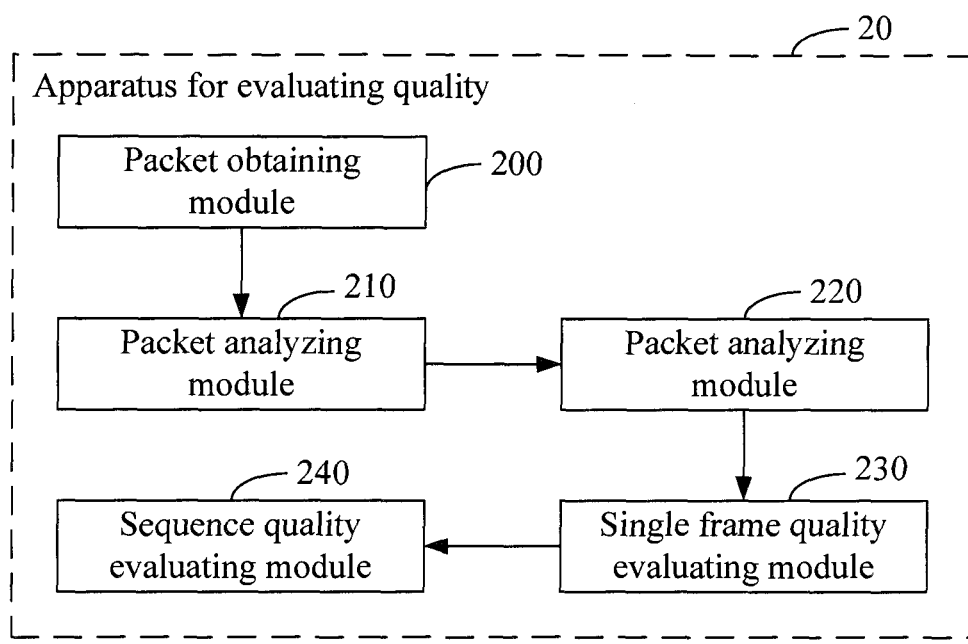
FIG. 3 shows a structure of an apparatus for evaluating quality of video streams in an embodiment of the present invention.

FIG. 3 shows a structure of an apparatus 20 for evaluating quality of video streams in an embodiment of the present invention. In this embodiment, the apparatus 20 for evaluating quality includes a packet obtaining module 200, a packet analyzing module 210, a stream analyzing module 220, a single frame quality evaluating module 230, and a sequence quality evaluating module 240.

The packet obtaining module 200 is configured to obtain video data packets transmitted in a channel. In this embodiment, the video data packets may be specified video service packets; that is, the video data packets may be VOD service packets, IPTV service packets and videophone service packets. In other embodiments, the video data packets may be used in network video services.

The packet analyzing module 210 is configured to analyze the video data packets obtained by the packet obtaining module 200. In this embodiment, the packet analyzing module 210 analyzes the packet loss information of the video data packets, where the packet loss information includes valid packets and lost packets and IDs of lost packets. In this embodiment, the packet analyzing module 210 may obtain the valid packets in the packet loss information of the video data packets and identify the lost packets by using prior arts. For example, it obtains the packet loss information of the video data packets by analyzing the network packet loss, jitter packet loss and packet loss due to buffer overflow.

The stream analyzing module 220 is configured to: receive the video data packets and packet loss information sent from the packet analyzing module 210, obtain video streams from the video data packets, and analyze the video streams to obtain the coding information of the video frames in the video data packets. In this embodiment, the stream analyzing module 220 obtains the video streams from the video data packets according to the video data packets, packet loss information and video compression standards, where the video compression standards are standards in the prior arts, for example, H.264 and MPEG-4. The video streams may be obtained from the video data packets by using the prior arts according to the video data packets, packet loss information and video compression standards.

In this embodiment, the stream analyzing module 220 is further configured to analyze the video frames in the video streams in the form of group of picture (GOP). In this embodiment, the coding information of the video frames includes the coding type of video frames, coding rate and frame rate parameter of the sequence. The coding types of video frames include I frame, P frame and B frame. The I frame is an intra coding frame; the P frame is a forward predictive frame; and the B frame is a bidirectional interpolated frame. The I frame is a complete picture, and the P frame and B frame record changes relative to the I frame or P frame. That is, each I frame is a reference frame for a P frame and a B frame. In this embodiment, the I frame, P frame and B frame do not correspond to those defined in the existing video standards only. Instead, the I frame may be all frames that use the intra-frame coding mode, and the P frame and B frame may be all frames that use the inter-frame coding mode.

The stream analyzing module 220 is further configured to send the coding information of the video frames in the streams to the single frame quality evaluating module 230 in the form of frames, where the coding information of the video frames may be sent to the single frame quality evaluating module 230 at random or in sequence.

The single frame quality evaluating module 230 is configured to: receive the coding information of the video frames from the stream analyzing module 220, and evaluate the single frame quality according to the coding information of the video frames. In this embodiment, the single frame quality evaluating module 230 is further configured to: judge the type of received coding information of a current frame; if determining that the received coding information of the current frame is the coding information of the I frame, evaluate the coding information of the I frame to obtain the single frame quality evaluation result of the I frame; if determining that the received coding information of the frame is the coding information of the P frame or B frame, buffer the coding information of the P frame or B frame, and after receiving and analyzing the coding information of a reference frame of the P frame or B frame, analyze the coding information of the P frame and B frame that use the reference frame as the reference. In this embodiment, the reference frame includes the I frame, P frame and B frame. The P frame may be the reference frame of the I frame or another P frame, and the B frame may be the reference frame of the I frame, P frame or another B frame.

In this embodiment, the single frame quality evaluating module 230 obtains the single frame quality evaluation result of the video frames by evaluating the coding type and coding rate of the video frames and frame rate parameter of the sequence. The single frame quality evaluating module 230 may evaluate the single frame quality according to the formula $Q=(C1 \times R+C2) \times L \times C3 \times f(Qr)$, where Q indicates the single frame quality evaluation result of a current frame; R indicates the coding rate of the current frame; when the current frame is an I frame, C1 and C2 indicate constants corresponding to the I frame; when the current frame is a P frame, C1 and C2 indicate constants corresponding to the P frame; when the current frame is a B frame, C1 and C2 indicate constants corresponding to the B frame; L indicates the frame rate parameter of the sequence; C3 indicates the normalized parameter of the frame rate parameter of the sequence and is a constant; Qr indicates the single frame quality evaluation result of a reference frame corresponding to the current frame; f (Qr) indicates the function of Qr. When the current frame is an I frame, f (Qr) is equal to 1; when the current frame is not an I frame and Qr is smaller than or equal to a threshold (T), f (Qr) is calculated by the following formula: $f(Qr)=C4 \times (T-Qr)/T$, where C4 is a constant; when Qr is greater than T, f (Qr) is equal to 1. In other embodiments, the single frame quality may also be evaluated by using a formula containing the reference coding type, coding rate and frame rate parameter of the sequence or by using a formula converted from the preceding formula.

The single frame quality evaluating module 230 is further configured to: send the single frame quality evaluation result of the video frames to the sequence quality evaluating module 240 and the sending apparatus 30, and send the single frame quality evaluation result to the displaying apparatus 40 or the storage apparatus 50 through the sending apparatus 30 to display or store the single frame quality evaluation result of the video frames.

The sequence quality evaluating module 240 is configured to evaluate the sequence quality according to the single frame quality evaluation result of the video frames sent from the single frame quality evaluating module 230. In this embodiment, the sequence quality evaluating module 240 calculates the mean value of single frame quality evaluation results within a time segment, determines a weighted value of the video frames by performing a square operation on the difference between the mean value and the single frame quality evaluation result of the video frames within the same time segment, and performs a weighted average operation on the weighted value and the single frame evaluation result of the video frames within the time segment to obtain the sequence quality evaluation result within the time segment. The preceding process may be represented by the following formulas:

$$Q_S = \sum_{i=1}^{i=n} (Q_{i,n} * P(i)) \bigg/ \sum_{i=1}^{i=n} P(i);$$

$$P(i) = \begin{cases} (Q_{i,n} - \overline{Q}_{i,n})^2 & Q_{i,n} - \overline{Q}_{i,n} < 0 \\ 1 & Q_{i,n} - \overline{Q}_{i,n} >= 0 \end{cases}$$

In the above formulas, $Q_S$ indicates the quality evaluation result of the frame sequence within the time segment; $Q_{i,n}$ indicates the single frame quality evaluation result of the $i^{th}$ frame; $\overline{Q}_{i,n}$ indicates the mean value of the single frame quality evaluation results within the time segment; and n indicates the number of video frames within the time segment. In other embodiments, the sequence quality evaluating module 240 may also obtain the sequence quality evaluation result by using the prior arts.

The sequence quality evaluating module 240 is further configured to: send the quality evaluation result of the frame sequence within the time segment to the sending apparatus 30, and send the sequence quality evaluation result to the displaying apparatus 40 or the storage apparatus 50 through the sending apparatus 30 to display or store the sequence quality evaluation result of the video frames within the time segment.

With the preceding system and apparatus for evaluating quality, the coding information of video frames is obtained; the single frame and sequence quality is evaluated and output according to the coding information of the video frames; the sequence quality of frames within a time segment is evaluated and output. Thus, the quality of video data packets transmitted in a channel may be predicted accurately, and the single frame quality evaluation result of the video frames as well as the sequence quality evaluation result of the video frames within a time segment may be obtained immediately.

Figure 4:
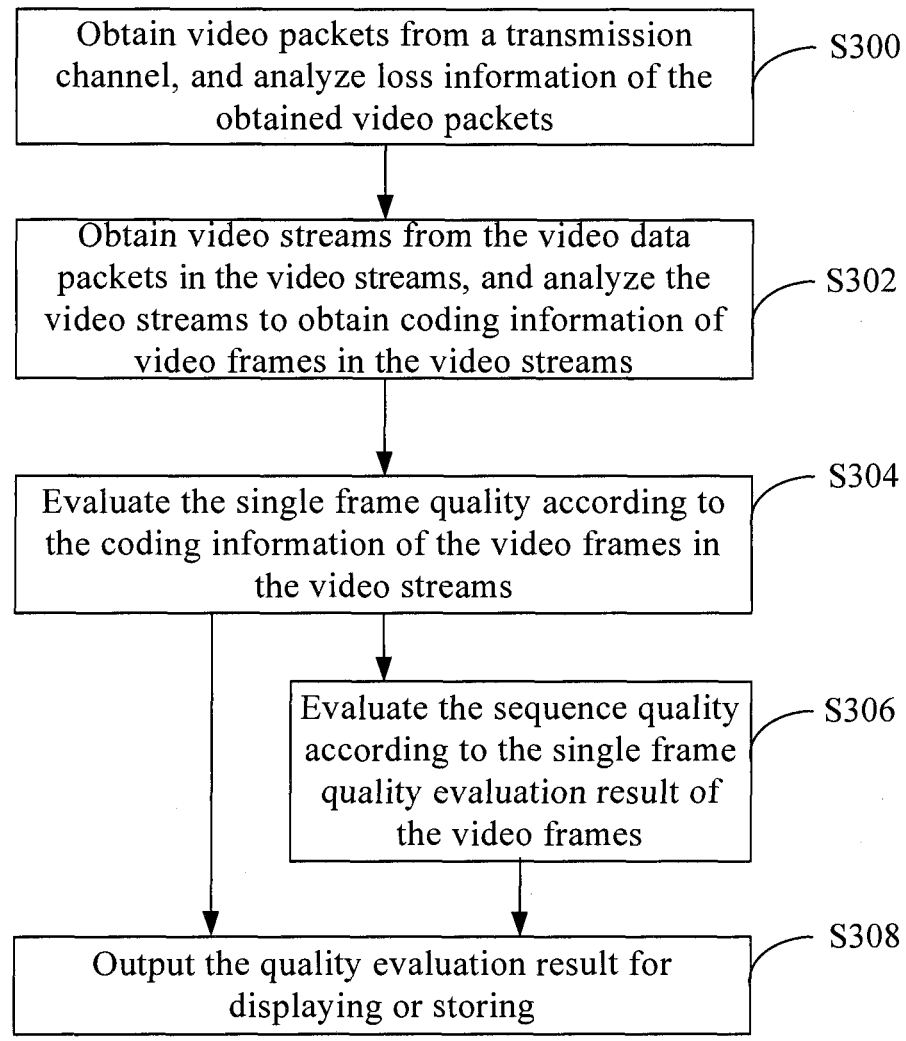
FIG. 4 is an overall flowchart of a method for evaluating quality of video streams in an embodiment of the present invention.

FIG. 4 is an overall flowchart of a method for evaluating quality of video streams in an embodiment of the present invention. In this embodiment, the quality evaluation method is used to evaluate the quality of video streams without using decoded picture elements. The quality evaluation method includes the following steps:

S300. Obtain video data packets from a transmission channel, and analyze the loss information of the obtained video data packets.

S302. Obtain video streams from the video data packets, and analyze the video streams to obtain the coding information of the video frames in the video streams.

S304. Evaluate the single frame quality according to the coding information of the video frames in the video streams.

S306. Evaluate the sequence quality according to the single frame quality evaluation result of the video frames.

S308. Send the quality evaluation result for displaying or storing. In this embodiment, the single frame quality evaluation result or sequence quality evaluation result is sent for displaying or storing.

Figure 5:
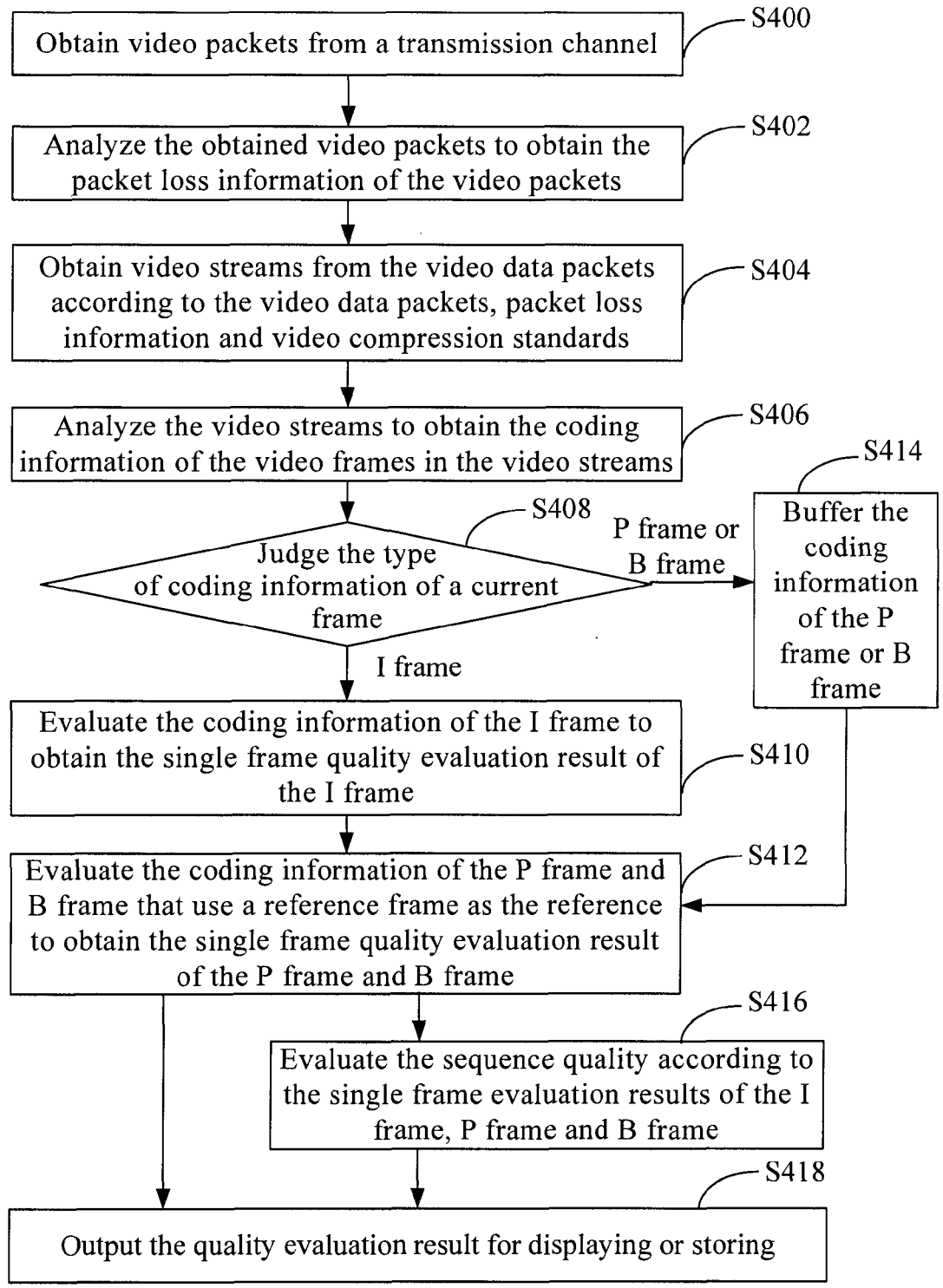
FIG. 5 is a flowchart of a method for evaluating quality of video streams in an embodiment of the present invention.

FIG. 5 is a flowchart of the method for evaluating quality of video streams shown in FIG. 4 in an embodiment of the present invention.

S400. Obtain video data packets from a transmission channel. In this embodiment, the video data packets may be specified video service packets; that is, the video data packets may be VOD service packets, IPTV service packets and videophone service packets. In other embodiments, the video data packets may be used in network video services.

S402. Analyze the obtained video data packets to obtain the packet loss information of the video data packets. In this embodiment, the packet loss information includes valid packets, lost packets and IDs of lost packets.

S404. Obtain video streams from the video data packets according to the video data packets, packet loss information and video compression standards.

S406. Analyze the video streams to obtain the coding information of the video frames in the video streams. In this embodiment, the coding information of the video frames includes the coding type of video frames, coding rate and frame rate parameter of the sequence. The coding types of video frames include I frame, P frame P and B frame. The I frame is an intra coding frame; the P frame is a forward predictive frame; and the B frame is bidirectional interpolated frame. The I frame is a complete picture, and the P frame and B frame record changes relative to the I frame. That is, each I frame is generally a reference frame for a P frame and a B frame. In this embodiment, the I frame, P frame and B frame do not correspond to those defined in the existing video standards only. Instead, the I frame may be all frames that use the intra-frame coding mode, and the P frame and B frame may be all frames that use the inter-frame coding mode.

S408. Judge the type of coding information of a current frame. In this embodiment, if it is determined that the coding information of the current frame is coding information of the I frame, the process proceeds to S410. If it is determined that the coding information of the current frame is coding information of the P frame or B frame, the process proceeds to S414.

S410. Evaluate the coding information of the I frame to obtain the single frame quality evaluation result of the I frame, and then proceed to S412. In this embodiment, the single frame quality is evaluated according to the coding type and coding rate of the video frames and frame rate parameter of the sequence. The single frame quality evaluation may be performed by using the formula: $Q=(C1 \times R + C2) \times L \times C3$, where Q indicates the single frame evaluation result of the current frame; R indicates the coding rate of the current frame; when the current frame is an I frame, C1 and C2 indicate constants corresponding to the I frame; L indicates the frame rate parameter of the sequence; C3 indicates the normalized parameter of the frame rate parameter of the sequence and is a constant. In other embodiments, the single frame quality may also be evaluated by using a formula containing the reference coding type, coding rate and frame rate parameter of the sequence or by using a formula converted from the preceding formula.

S414. Buffer the coding information of the P frame or B frame and then proceed to S412.

S412. Evaluate the coding information of the P frame and B frame that use a reference frame as the reference to obtain the single frame quality evaluation results of the P frame and B frame. In this embodiment, the reference frame includes the I frame, P frame and B frame. The P frame may be the reference frame of the I frame or another P frame, and the B frame may be the reference frame of the I frame, P frame or another B frame. In this embodiment, after the single frame quality of the I frame is evaluated, the following operations are performed in sequence: evaluate the coding information of the current P frame and B frame that use the I frame as the reference to obtain the single frame quality evaluation results of the current P frame and the B frame; evaluate the coding information of another P frame and another B frame that use the current P frame as the reference to obtain the single frame quality evaluation results of another P frame and another B frame; evaluate the coding information of a B frame other than the current B frame and a B frame other than the preceding another B frame that use the current B frame or the preceding another B frame as the reference to obtain the single frame quality evaluation result of the B frame.

In this embodiment, the single frame quality is evaluated by using the formula: $Q=(C1 \times R+C2) \times L \times C3 \times f(Qr)$, where Q indicates the quality evaluation result of the current frame; R indicates the coding rate of the current frame; when the current frame is a P frame, C1 and C2 indicate constants corresponding to the P frame; when the current frame is a B frame, C1 and C2 indicate constants corresponding to the B frame; L indicates the frame rate parameter of the sequence; C3 indicates the normalized parameter of the frame rate parameter of the sequence and is a constant; Qr indicates the single frame evaluation result of a reference frame corresponding to the current frame; $f(Qr)$ is the function of Qr. When Qr is smaller than or equal to a preset threshold (T), $f(Qr)$ is calculated by the following formula: $f(Qr)=C4 \times (T-Qr)/T$, where C4 is a constant; when Qr is greater than T, $f(Qr)$ is equal to 1.

In this embodiment, after S412 is executed, the process proceeds to S416 and S418 at the same time.

S416. Evaluate the sequence quality according to the single frame evaluation results of the I frame, P frame and B frame. In this embodiment, the sequence quality of the frames is evaluated according to the single frame quality evaluation results of the received video frames within a time segment by using the following formulas.

$$Q_S = \sum_{i=1}^{i=n} (Q_{i,n} * P(i)) \bigg/ \sum_{i=1}^{i=n} P(i);$$

$$P(i) = \begin{cases} (Q_{i,n} - \overline{Q}_{i,n})^2 & Q_{i,n} - \overline{Q}_{i,n} < 0 \\ 1 & Q_{i,n} - \overline{Q}_{i,n} >= 0 \end{cases}$$

In the above formulas, $Q_S$ indicates the quality evaluation result of the frame sequence within the time segment; $Q_{i,n}$ indicates the single frame quality evaluation result of the $i^{th}$ frame; $\overline{Q}_{i,n}$ indicates the mean value of the single frame quality evaluation results within the time segment; n indicates the number of frames within the time segment. After S416 is executed, the process proceeds to S418.

S418. Send the quality evaluation result for displaying and storing. In this embodiment, if the single frame quality evaluation result or sequence quality evaluation result needs to be displayed, the single frame quality evaluation result or sequence quality evaluation result needs to be sent through the sending apparatus to the displaying apparatus, which displays the single frame quality evaluation result or sequence quality evaluation result of the video frames within the time segment. if the single frame quality evaluation result or sequence quality evaluation result does not need to be displayed, the single frame quality evaluation result or sequence quality evaluation result is sent through the sending apparatus to the storage apparatus, which stores the single frame quality evaluation result or sequence quality evaluation result of the video frames within the time segment.

According to the quality evaluation method provided in the embodiments of the present invention, the coding information of the video frames is obtained without using the decoded picture elements; the single frame and sequence quality is evaluated and output according to the coding information of the video frames; the sequence quality of frames within a time segment is evaluated and output. Thus, the quality of video data packets transmitted in a channel can be predicted accurately, and the single frame quality evaluation result of the video frames as well as sequence quality evaluation result of the video frames within a time segment may be obtained immediately.

It is understandable to those skilled in the art that all or part of the steps in the preceding embodiments may be implemented by hardware instructed by a program. The program may be stored in a computer readable storage medium. When the program is executed, the processes of the methods in the preceding embodiments may be involved. The storage medium may be a magnetic disk, a compact disk (CD), a read-only memory (ROM), or a random access memory (RAM).

Although the invention has been described through several exemplary embodiments, the invention is not limited to such embodiments. It is apparent that those skilled in the art can make various modifications and variations to the invention without departing from the scope of the invention.

What is claimed is:

1. A method for evaluating quality of video streams, comprising:
   obtaining a sequence of video frames for one or more video streams;
   obtaining coding information associated with video frames in the sequence of video frames, in which the coding information comprises a coding type of the video frames;
   determining whether the coding type of a current frame is a first coding type or a second coding type;
   evaluating single frame quality levels for individual frames in the sequence of frames according to the coding information to obtain a single frame quality evaluation result, if it is determined that the coding information of the current frame is the first coding type, wherein the evaluating, when the coding information of the current frame is the first coding type, is based at least in part on a coding rate of the current frame, at least one intra-coded (I) frame constant, or a frame rate parameter of the sequence of video frames;

delaying evaluating of the single frame quality levels until coding information of a reference frame for the second coding type is received and analyzed, if it is determined that the coding information of the current frame is the second coding type, wherein the evaluating, when the coding information of the current frame is the second coding type, is based at least in part on a coding rate of the current frame, at least one predicted (P) frame constant when the current frame is a P frame, at least one bidirectional (B) frame constant when the current frame is a B frame, or a frame rate parameter of the sequence of video frames; and evaluating a sequence quality level for the entire sequence of frames in accordance with the single frame quality levels.

2. The method according to claim 1, wherein the coding information comprises a coding rate, packet loss information, and the frame rate parameter of the sequence of video frames.

3. The method according to claim 2, wherein evaluating the single frame quality levels comprises: using the coding type of the video frames, the coding rate, the packet loss information, and the frame rate parameter of the sequence of video frames to evaluate the single frame quality levels, wherein the coding type identifies each frame as an I frame, a P frame, or a B frame.

4. The method according to claim 1, wherein the method further comprises: outputting the single frame quality levels or the sequence quality level.

5. The method according to claim 1, wherein evaluating the single frame quality levels comprises:

evaluating single frame quality levels for each respective I frame before evaluating single frame quality levels for P frames and B frames corresponding to the respective I frame.

6. The method according to claim 5, wherein evaluating single frame quality levels for each respective I frame before evaluating single frame quality levels for P frames and B frames corresponding to the respective I frame comprises:

buffering coding information for corresponding P frames and B frames while evaluating the single frame quality level of the respective I frame; and evaluating the single frame quality level for the corresponding P frames and B frames in accordance with the buffered coding information after evaluating the single frame quality for the respective I frame.

7. An apparatus comprising:

a processor; and a computer readable storage medium storing programming for execution by the processor, the programming including instructions to:

obtain a sequence of video frames for one or more video streams;

obtain coding information associated with video frames in the sequence of video frames, in which the coding information comprises a coding type of the video frames;

determine whether the coding type of a current frame is a first coding type or a second coding type;

evaluate single frame quality levels for individual frames in the sequence of frames according to the coding information to obtain a single frame quality evaluation result, if it is determined that the coding information of the current frame is the first coding type, wherein the evaluating, when the coding information of the current frame is the first coding type, is based at least in part on a coding rate of the current frame, at least one intra-coded (I) frame constant, or a frame rate parameter of the sequence of video frames;

delay evaluating of the single frame quality levels until coding information of a reference frame for the second coding type is received and analyzed, if it is determined that the current frame is the second coding type, wherein the evaluating, when the coding information of the current frame is the second coding type, is based at least in part on a coding rate of the current frame, at least one predicted (P) frame constant when the current frame is a P frame, at least one bidirectional (B) frame constant when the current frame is a B frame, or a frame rate parameter of the sequence of video frame; and evaluate a sequence quality level for the entire sequence of frames in accordance with the single frame quality levels.

8. The apparatus according to claim 7, wherein the coding information comprises packet loss information, and the frame rate parameter of the sequence of video frames.

9. The apparatus according to claim 8, wherein the instructions to evaluate single frame quality levels for individual frames in the sequence of frames includes instructions to:

use the coding type, the coding rate, the packet loss information, and the frame rate parameter to evaluate the single frame quality levels, wherein the coding type identifies each frame as an I frame, a P frame, or a B frame.

10. The apparatus according to claim 7, wherein the instructions to evaluate single frame quality levels for individual frames in the sequence of frames includes instructions to:

evaluate single frame quality levels for each respective I frame before evaluating single frame quality levels for P frames and B frames corresponding to the respective I frame.

11. The apparatus according to claim 10, wherein the instructions to evaluate single frame quality levels for each respective I frame before evaluating single frame quality levels for P frames and B frames corresponding with the respective I frame includes instructions to:

buffer coding information for corresponding P frames and B frames while evaluating the single frame quality level of the respective I frame; and evaluate the single frame quality level for the corresponding P frames and B frames in accordance with the buffered coding information after evaluating the single frame quality for the respective I frame.

12. The apparatus according to claim 7, wherein the programming further includes instructions to:

obtain video data packets transmitted in a channel; and analyze packet loss information of the video data packets, wherein the packet loss information comprises valid packets and lost packets and IDs of lost packets.

13. The apparatus according to claim 12, wherein the instructions to analyze packet loss information of the video data packets include instructions to:

obtain video streams according to the video data packets, the packet loss information, and video compression standard.

14. The apparatus according to claim 7, wherein the programming further includes instructions to:

output the single frame quality levels or the sequence quality level.

15. An apparatus comprising:
a processor; and
a computer readable storage medium storing programming for execution by the processor, the programming including instructions to:
  obtain a sequence of video frames for one or more video streams;
  obtain coding information associated with video frames in the sequence of video frames;
  evaluate single frame quality levels for individual frames in the sequence of frames according to the coding information; and
  evaluate a sequence quality level for the entire sequence of frames in accordance with the single frame quality levels;
wherein the instructions to evaluate the sequence quality level for the entire sequence of frames includes instructions to:
  calculate a mean value of single frame quality levels within a time segment;
  determine a weighted value of the video frames by performing a square operation on the difference between the mean value and the single frame quality levels within the time segment; and
  perform a weighted average operation on the weighted value and the single frame quality levels within the time segment to obtain the sequence quality level within the time segment.

* * * * *